United States Patent [19]
Kitano

[11] Patent Number: 5,745,280
[45] Date of Patent: Apr. 28, 1998

[54] LIGHT MODULATION APPARATUS AND METHOD FOR MAKING LIGHT MODULATION APPARATUS

[75] Inventor: Hirohisa Kitano, Osaka, Japan

[73] Assignee: Minolta Co., Ltd., Osaka, Japan

[21] Appl. No.: 189,765

[22] Filed: Feb. 1, 1994

[30] Foreign Application Priority Data

Feb. 4, 1993 [JP] Japan ................................. 5-017211

[51] Int. Cl.⁶ ................................................ G02B 26/00
[52] U.S. Cl. ................................. 359/290; 359/240
[58] Field of Search ............................. 359/240, 290, 359/321

[56] References Cited

U.S. PATENT DOCUMENTS

| | | | |
|---|---|---|---|
| 4,733,927 | 3/1988 | Jackson et al. | |
| 5,007,696 | 4/1991 | Thackara et al. | 385/2 |
| 5,093,676 | 3/1992 | Matsubara et al. | 346/160 |
| 5,247,387 | 9/1993 | Matsubara et al. | 346/160 |
| 5,541,039 | 7/1996 | McFarland et al. | 430/290 |

FOREIGN PATENT DOCUMENTS 3-270873  4/1993  Japan .

Primary Examiner—Georgia Y. Epps
Assistant Examiner—Thomas Robbins
Attorney, Agent, or Firm—Burns, Doane, Swecker & Mathis, LLP

[57] ABSTRACT

A light modulation apparatus having a light shutter element which has an electro-optic effect, such as a PLZT. A pair of electrodes are provided on the light shutter element, and a DC voltage applying circuit is connected to the electrodes. The top surface, where the electric field is applied, exhibits modified electrical characteristics.

44 Claims, 5 Drawing Sheets

LIGHT MODULATION APPARATUS AND METHOD FOR MAKING LIGHT MODULATION APPARATUS

BACKGROUND OF THE INVENTION

1. Field of the Invention

The present invention relates to a light modulation apparatus and method for making a light modulation apparatus comprising materials having an electro-optic effect such as PLZT, LiNbO$_3$ and the like.

2. Description of the Invention

Light modulation apparatus utilizing materials having an electro-optic effect such as PLZT transparent ceramics and the like are well known. An example of such a conventional light modulation apparatus is shown in FIG. 1. This light modulation apparatus is provided with a pair of electrodes 2 and 3, which are connected to each other via a direct current (DC) voltage supply circuit 10. An electric field E is formed in a part of the light modulation element 1 interposed between the aforesaid electrodes 2 and 3 by applying a voltage V from the DC voltage supply circuit 10. A polarizer A is provided upstream from the light modulation element 1 with respect to the light entrance direction, and an analyzer B is provided downstream from the light modulation element 1. The deflection directions of the aforesaid polarizer A and analyzer B are set so as to be mutually orthogonal, and are set so as to incline at a 45° angle with respect to the direction of generation of the electric field E, respectively.

When a voltage V is not supplied from the DC voltage supply circuit 10, the light modulation element 1 is optically isotropic, such that the light entering through the polarizer A is shielded by the analyzer B. On the other hand, when a voltage V is applied, a birefringence is generated in a parallel direction and a perpendicular direction relative to the direction of the electric field E in a portion the electric field E formed within the light modulation element 1 (hereinafter referred to as "voltage applied portion") due to the application of said voltage V, and the light passes through the voltage applied portion such that its phase is changed, with the result that said light passes through the analyzer B. The aforesaid light modulation apparatus has characteristics of high responsiveness and of a high degree of contrast, and therefore may be expected to be used as the print head in high-speed printers as well as display devices.

In the light modulation apparatus of the previously described type, when a DC voltage V is applied over a long period as light irradiates the voltage applied portion, it is known that the characteristics will typically change. This change in characteristics is due to the generation of a charge originating in the material characteristics (photoconductivity) within the area of the voltage applied portion to which the DC voltage V is applied. When a DC voltage V is applied over a long period, the charge remains in the voltage applied portion, thereby forming a residual spatial electric field. The aforesaid residual spatial electric field is known to be particularly strong in the vicinity of the electrodes due to the DC voltage applied to the voltage applied portion. Conventional light modulation elements are such that the light transmission capability changes by means of the aforesaid residual spatial electric field. More specifically, a reduction of the contrast is occurs by elevating the half-wave voltage which maximizes the amount of light transmission, or by increasing the amount of light leakage in the state wherein a voltage V is not applied.

To improve the aforesaid disadvantage:

(1) Eliminate the residual charge by replacing the DC voltage with an alternating current (AC) voltage (AC-type pulse voltage). (U.S. Pat. No. 5,093,676)

(2) Periodically stop the application of the DC voltage, and irradiate light in said state. (U.S. Pat. No. 5,247,387)

The efficacy of these and other methods have been previously verified. The method of (1) above requires a circuit construction to apply the AC voltage; and the method of (2) above requires a circuit construction to temporarily stop the use of the light modulation element. Moreover, the method of (2) requires a long period to remove the disadvantage completely.

SUMMARY OF THE INVENTION

A main object of the present invention is to provide a light modulation apparatus capable of reducing the fluctuation in light transmission capability by modifying the light modulation element itself.

Another object of the present invention is to provide a light modulation element which is capable of continuous use over long periods.

A further object of the present invention is to provide a light modulation apparatus which is normally stable, virtually without fluctuation in characteristics even when a DC voltage is applied over long periods, without attachment of special new circuits or components.

To achieve the above objects, the inventors considered the method of (2), and guessed the reasons of the improvements as follows.

(1) The charge which is trapped at the space of the voltage applied portion is excited by the irradiated light and discharged to the outside of the voltage applied portion.

(2) The residual charge is cancelled by the light carrier which is generated in the voltage applied portion by the irradiated light.

Consequently, the inventors considered following conditions which avoid the residual charge.

(1) Securing low electrical resistivity so as to discharge the residual charge easily.

(2) Securing the photoconductivity so as to cancel the generated charge easily.

These objects are achieved by the light modulation element of the present invention which forms a modified region within at least a portion of the voltage applied portion.

In this instance, the voltage applied portion is defined as the area wherein an electric field is generated by applying a voltage between a pair of electrodes.

Various materials such as PLZT, LiNbO$_3$, Bi$_{12}$GeO$_{20}$, Bl$_{12}$SiO$_{20}$, Bi$_{12}$TiO$_{20}$, BaTiO$_3$ and the like may be used as the light modulation element material. Further, various processing methods may be used for modifying a portion of the voltage applied portion such as heating methods, reactive spattering methods, plasma reaction methods and the like.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

The preferred embodiments of the light modulation element of the present invention are described hereinafter with reference to their methods of manufacture and the accompanying drawings.

Figure 2:
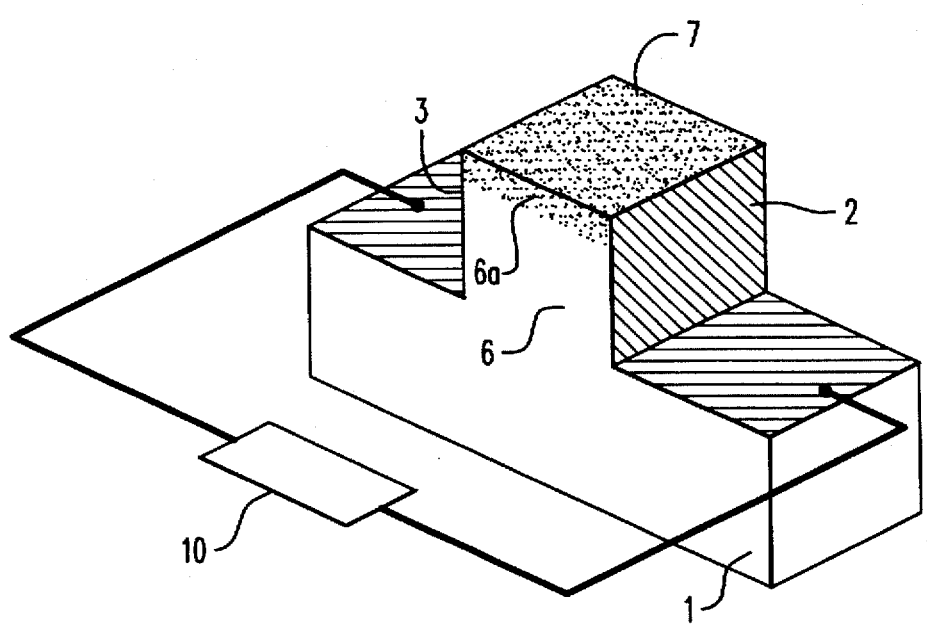
FIG. 2 is a perspective view showing a first embodiment of the light modulation apparatus of the present invention.
Figure 3:
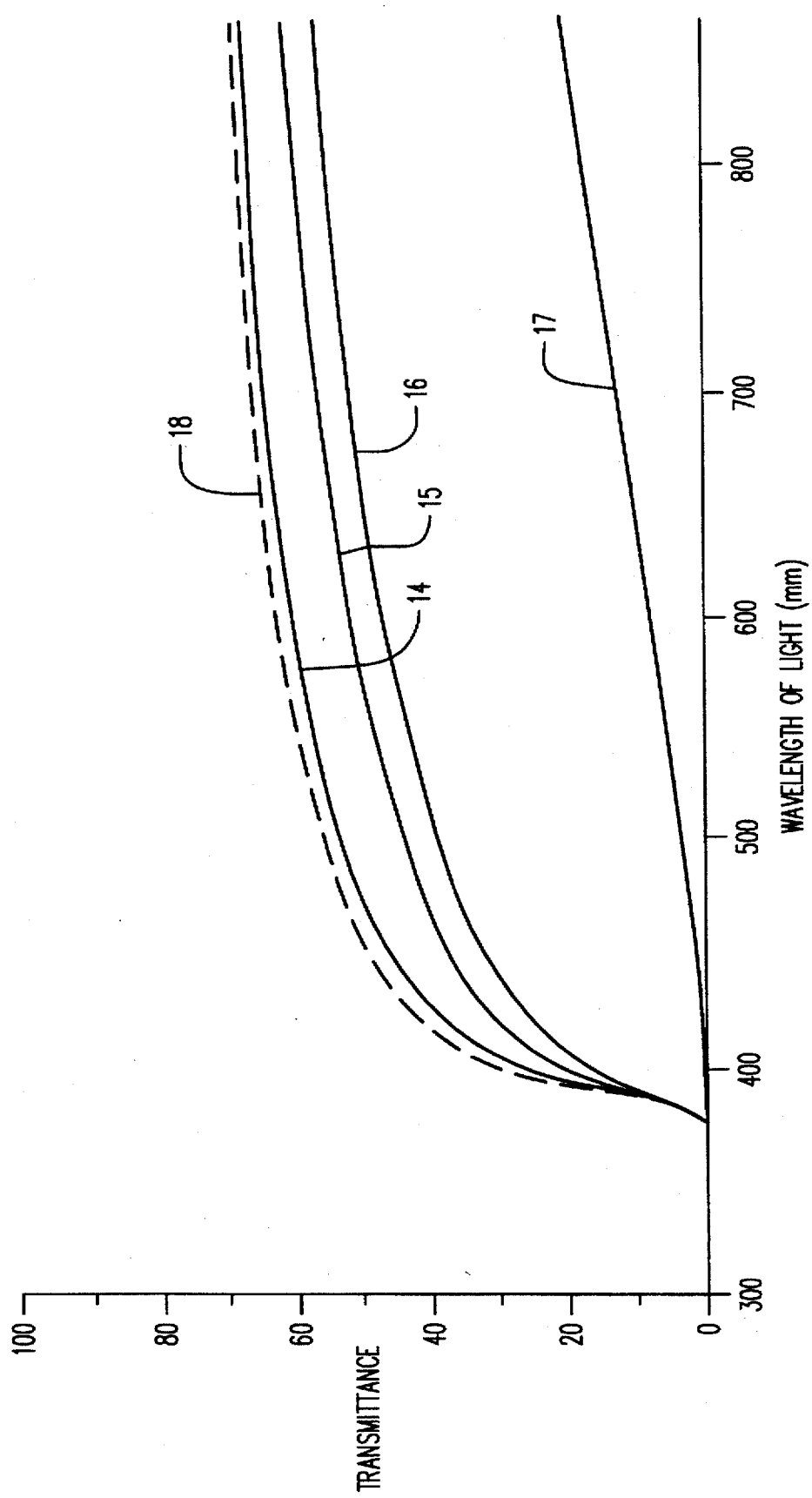
FIG. 3 is a graph showing the spectral transmission characteristics of the light modulation element of FIG. 2.
Figure 4:
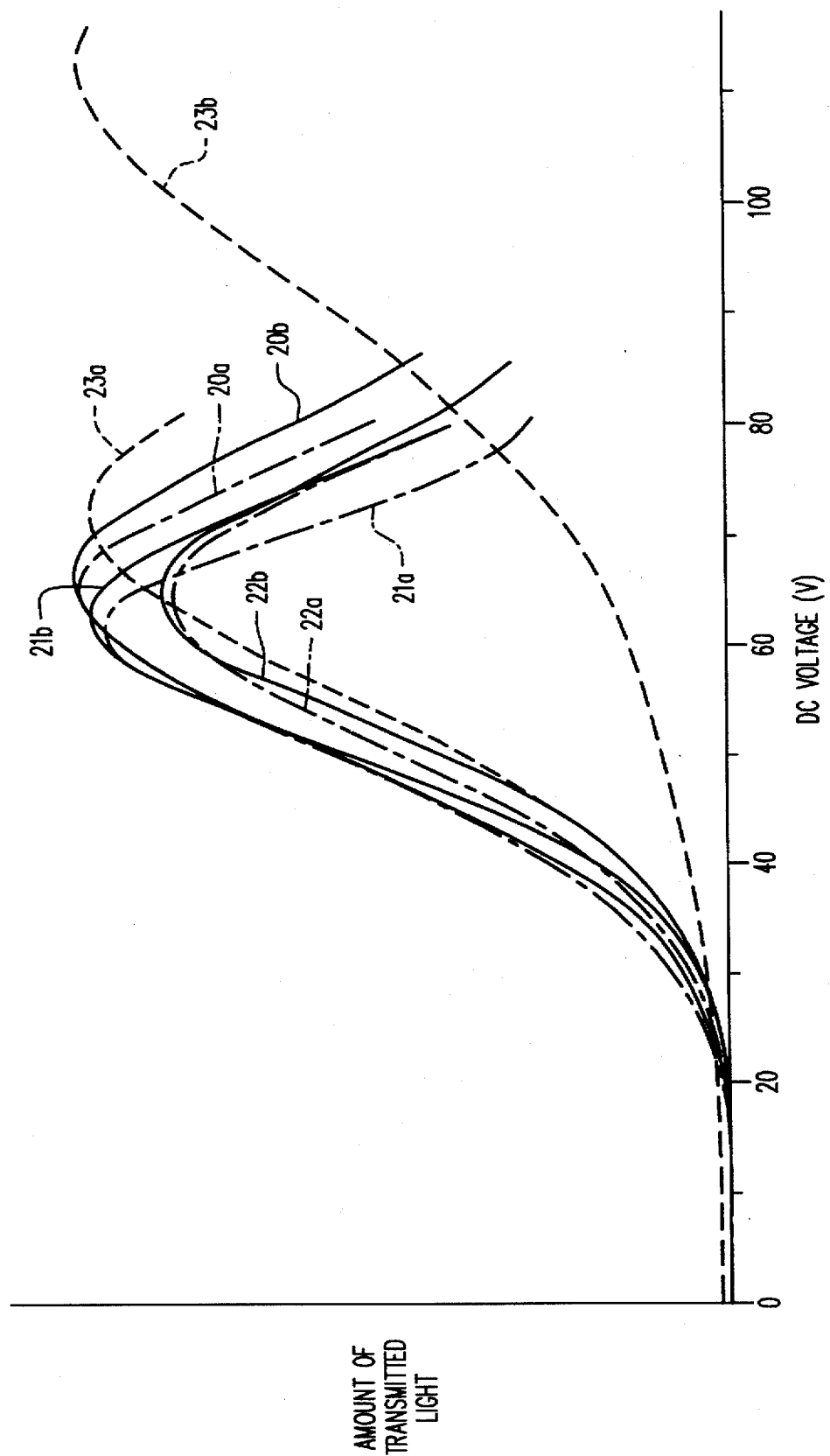
FIG. 4 is a graph showing the relationship between the amount of transmitted light and the applied DC voltage of the light modulation element shown in FIG. 2.

First Embodiment (FIGS. 2–4)

As shown in FIG. 2, the light modulation apparatus comprises the optical shutter element 1, i.e., the light modulation element, provided with a rectangular-shaped optical shutter portion 6. The top surface 7 of the optical shutter portion 6 is a transmission surface, such that light is transmitted from the bottom surface to the top surface 7. Here, a light source is omitted from FIG. 2. The top section of the optical shutter portion 6, i.e., a part of voltage applied portion, forms a region 6a which is modified by means of a heat processing method described later. Although the light modulation apparatus shown in FIG. 2 is provided with a single optical shutter section, normally the light modulation apparatus comprises an optical shutter array, which is consisted a array of the optical shutter elements 1, 1, . . .

The optical shutter elements 1, 1, . . . are provided with a common electrode 2, which is common to all said optical shutter elements 1, 1 . . . provided on one side surface of the optical shutter portion 6, and with individual electrodes 3, which is provided for each individual said optical shutter element 1, disposed on the other side of said optical shutter portion 6. A DC voltage supplying circuit 10 is provided to electrically connect the common electrode 2 and the individual electrodes 3. The region of the optical shutter portion 6 which is interposed between the aforesaid common electrode 2 and said individual electrodes 3 functions as the voltage applied portion.

The operation and effectiveness of the optical shutter apparatus of the previously described construction is described hereinafter.

When a DC voltage supplied from the DC voltage supplying circuit 10 is applied between the common electrode 2 and the individual electrodes 3, a DC electric field is generated within the optical shutter portion 6. Linearly polarized light inclined 45° via a polarizer (not shown in the illustration) enters the optical shutter portion 6 in the direction of the aforesaid DC electric field. When a DC voltage is applied to the optical shutter portion 6, the linearly polarized light is rotated 90° via the electro-optic effect so as to be transmitted within said optical shutter portion 6, and thereafter said light is introduced to an analyzer (not illustrated). The direction of deflection of the analyzer is set at 90° relative to the direction of deflection of the polarizer, such that the linearly polarized light is transmitted through the analyzer. On the other hand, when a DC voltage is not applied to the optical shutter portion 6, the linearly polarized light is transmitted within the optical shutter portion 6 without a change in its direction of deflection, and is thereafter introduced to the analyzer. However, the linearly polarized light is shielded by means of the aforesaid analyzer because it does not process a component to be transmitted through said analyzer.

An example of a method for manufacturing the optical shutter element 1 is described hereinafter.

After adequately washing a plate-like wafer comprising materials having an electro-optic effect, an aluminum film is formed on one surface of said wafer via a means such as vacuum vapor deposition, spattering or the like. Various materials such as PLZT, $LiNbO_3$, $Bi_{12}GeO_{20}$, $Bi_{12}SiO_{20}$, $Bi_{12}TiO_{20}$, $BaTiO_3$ and the like may be used as the aforesaid wafer material.

Then, the wafer is inserted in an electric furnace an subjected to a heating process in an atmosphere of nitrogen gas at an atmospheric pressure of one atmosphere. The conditions of this process are as follows: heating (temperature elevation) rate of 10° C. per minute; holding temperature of 300°–600° C. for two hours; cooling (temperature drop) rate of minus 10° C. per minute. After the heating process, the aluminum film is very carefully removed from the surface of the wafer so as to avoid damage thereto by a means such as etching (wet or dry) or the like.

Thus, the surface portion of the wafer from which the aluminum film has been removed is modified. That is, the surface resistance of the modified surface markedly reduces the electrical resistivity compared to that of a normal wafer which is not subjected to the aforesaid heating process. For example, the electrical resistivity of a wafer surface subjected to a heating process at a holding temperature of 600° is about $10^6$ $\Omega$cm compared to the electrical resistivity of the surface of a normal wafer which is about $10^{13}$ $\Omega$cm.

FIG. 3 is a graph showing the measured spectral transmittance when using PLZT as the wafer material. The solid lines 14, 15, 16, and 17 indicate the spectral transmittance of wafers subjected to heating processes at holding temperatures of 300°, 400°, 500°, and 600° C., respectively. As a comparison, the dashed line 18 indicates the spectral transmittance of a normal wafer not subjected to a heating process. The transmittance is gradually decreased as the holding temperature becomes higher, and the wafer heat-treated at a holding temperature of 600° C. has virtually no transmittance, such that such a wafer is difficult to use as a light modulation element. Here, the graph shown in FIG. 3 shows the transmittance of the light modulation element itself, these measurements were obtained without applying a voltage and without using a polarizer and analyzer.

Then, each of the wafers having the spectral transmittances shown in FIG. 3 (excluding the wafer heat-treated at a holding temperature of 600° C.) were shaped as shown in FIG. 2 by a means for machining or the like. That is, the modified surface was set as the transmission surface 7 of the linear optical shutter portion 6. Two side surfaces of the optical shutter portion 6 are provided with the common electrode 2 and individual electrode 3 by a means such as aluminum spattering, vacuum vapor deposition or the like, to produce the optical shutter element 1.

FIG. 4 is a graph showing the relationship between the amount of transmitted light and the DC applied voltage of the obtained optical shutter elements 1. The dashed line 20a and the solid line 20b indicate the characteristics of the transmitted light directly after a DC voltage is applied and after a DC voltage is applied continuously for 3 hours relative to the optical shutter element manufactured by heat-treating the wafer at a holding temperature of 300° C. The dashed line 21a and the solid line 21b indicate the characteristics of the transmitted light directly after a DC voltage is applied and after a DC voltage is applied continuously for 3 hours relative to the optical shutter element manufactured by heat-treating the wafer at a holding temperature of 400° C. The dashed line 22a and the solid line 22b indicate the characteristics of the transmitted light directly after a DC voltage is applied and after a DC voltage is applied continuously for 3 hours relative to the optical shutter element manufactured by heat-treating the wafer at a holding temperature of 500° C. For comparison purposes, the dashed line 23a and solid line 23b indicate the characteristics of the transmitted light directly after a DC voltage is applied and after a DC voltage is applied continuously for 3 hours relative to the optical shutter element manufactured without heat processing. The optical shutter element manufactured with a wafer which was not subjected to a heating process exhibited extreme fluctuation in characteristics when a DC voltage was applied over a long period. That is, the half-wavelength voltage became higher compared to directly after the DC voltage was applied, and the amount of light leakage increased in the state wherein a DC voltage was not applied.

On the other hand, the optical shutter elements manufactured with wafers having a surface modified by heat processing exhibited stable characteristics with virtually no fluctuation even when a DC voltage was applied over a long period.

As previously described, the generation of a charge within the optical shutter portion 6 generating a DC electric field originates in the material characteristics (photoconductivity). However, the light modulation apparatus of the present invention did not result in the reduction of the contrast caused by the elevation of the half-wave voltage or the increasing of the light leakage. This advantage of the present invention is considered to be caused by at least one reason of the following reasons.

(1) As the result of the modification of the wafer, the electric resistivity of the region 6a is decreased. Therefore, the charge which generates within the optical shutter portion 6 travels within the region 6a of low electric resistivity formed at the top portion of the optical shutter portion 6, is recombined, and discharged to the outside of said optical shutter portion 6.

(2) As the result of the modification of the wafer, the photoconductivity of the region 6a is increased. (This fact is understood from the reduction of spectral transmittance of the region 6a. In general, when the photoconductivity of a material is increased, the spectral transmission is decreased.) Therefore, the charge is cancelled by the light carrier which is generated in the voltage applied portion.

Accordingly, the charge is removed, and does not remain within the optical shutter portion 6, thereby suppressing the generation of a residual spatial electric field.

As a result of the surface modification, the characteristics of the light modulation apparatus remain stable and are virtually unchanged even when a DC voltage is applied thereto over a long period.

Second Embodiment

Figure 5:
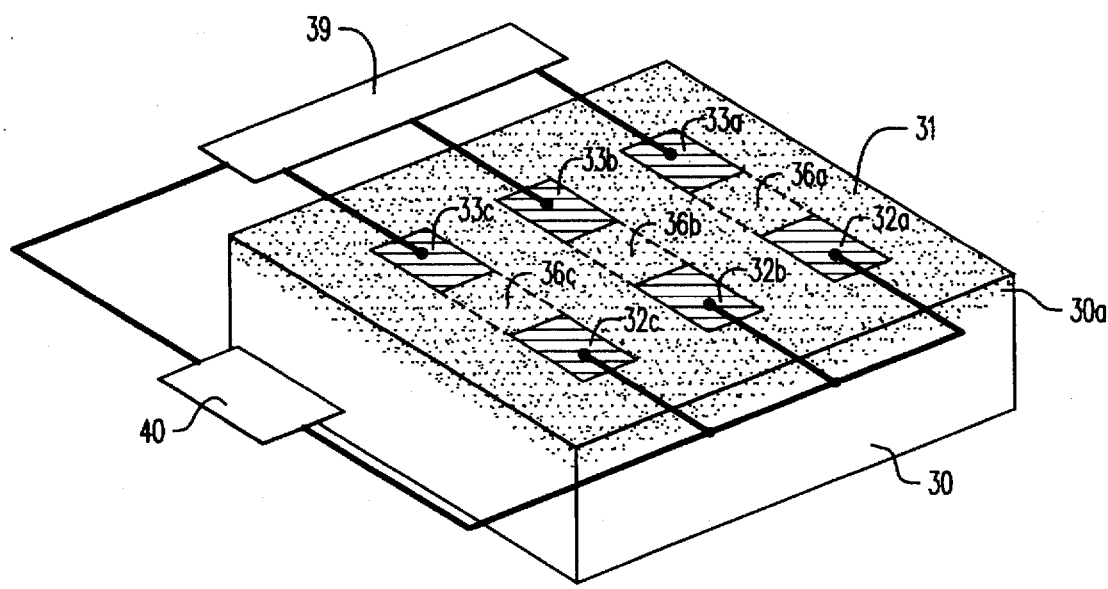
FIG. 5 is a perspective view showing a second embodiment of the light modulation apparatus of the present invention.
Figure 1:
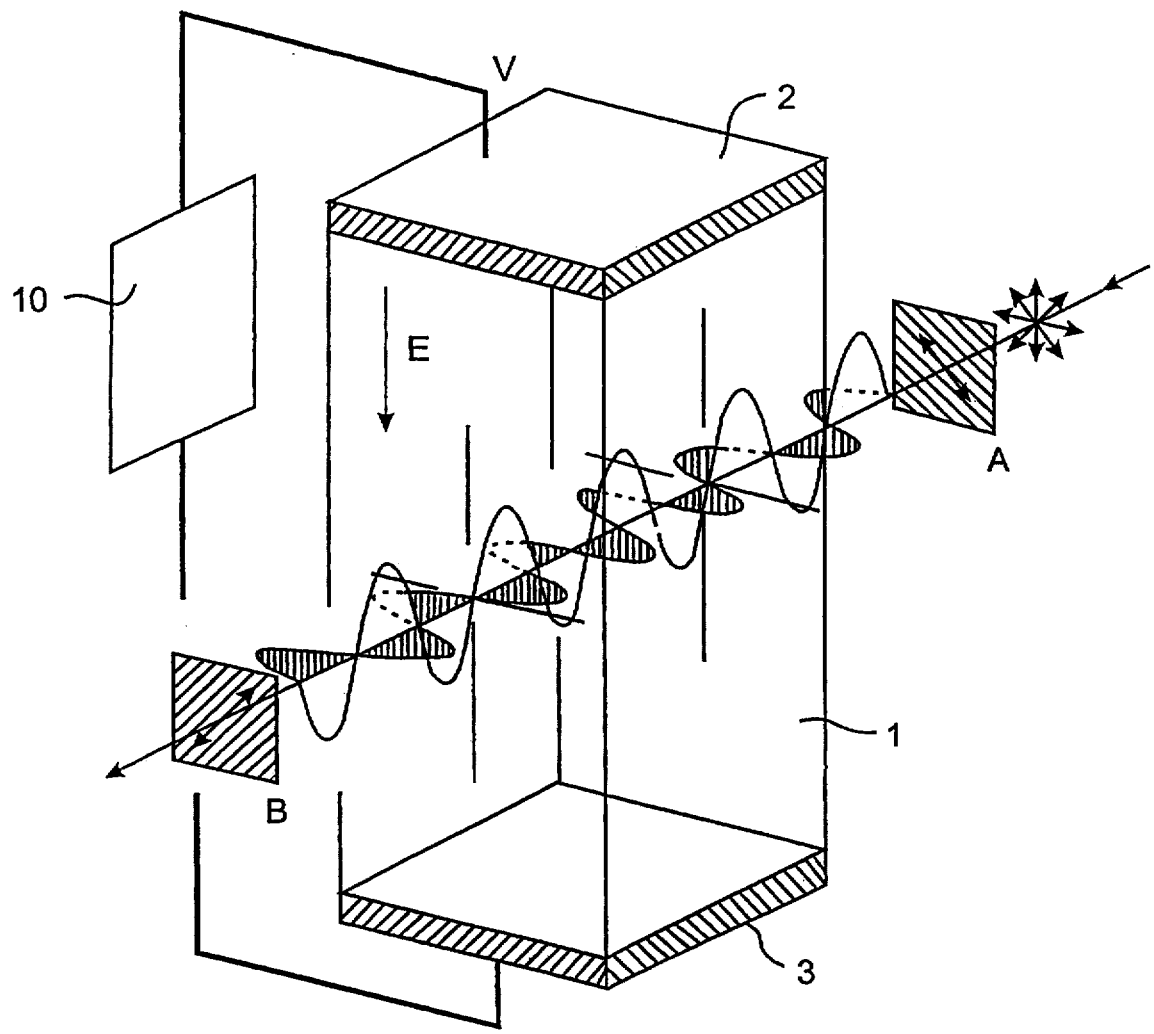

FIG. 5 shows a light modulation apparatus which comprises a planer optical shutter element 30. The top portion of the optical shutter element 30 comprising materials having an electro-optic effect has a surface modified by a heat processing method identical to that described in the first embodiment, and said top portion has a region 30a of low electrical resistivity.

On the surface 31 of the aforesaid optical shutter array 30 are formed common electrodes 32a, 32b, 32c, and individual electrodes 33a, 33b, 33c via a photolithographic means. The region medial to the common electrode 32a and the individual electrode 33a (region interposed between the dotted lines in the drawing) is designated the optical shutter portion 36a, i.e., the voltage applied portion. Similarly, the region medial to the common electrode 32b and individual electrode 33b, and the region medial to the common electrode 32c and individual electrode 33c are designated optical shutter portions 36b and 36c, respectively. The individual electrodes 33a, 33b, 33c are electrically connected to a DC voltage supply circuit 40 via a driver circuit 39, and the common electrodes 32a, 32b, 32c are electrically connected to DC voltage supply circuit 40.

The optical shutter element 30 of the previously described construction provides the same operation and effectiveness as the optical shutter element 1 of the first embodiment.

Other Embodiment

The modified region may be provided in the vicinity of the common electrodes or the individual electrodes. For example, in forming the region 6a of low electrical resistivity in the vicinity of the electrodes 2 and 3 of the linear optical shutter element 1 of the first embodiment, the surface may be modified by the previously described heating process after forming aluminum films as the electrodes 2 and 3 at desirable positions.

Light irradiation may be accomplished when a DC voltage applied to the individual electrodes and common electrodes is periodically stopped temporarily.

The voltage applied to the individual electrodes and common electrodes may be an AC voltage (alternating current pulse voltage).

The method for providing the modified region in the voltage applied portion may by a reactive spattering method, plasma reaction method or the like instead of the previously described heating process of the aforesaid embodiments.

When the common electrodes and individual electrodes are provided on the anterior and posterior surfaces of the light modulation element, said anterior and posterior surfaces may be modified surfaces.

As can be clearly understood form the above description, the present invention provides a light modulation element provided with a modified region in at least one part of a voltage applied portion to suppress a residual spatial electric field even when a DC voltage is applied over a long period, thereby achieving normal stability with virtually no fluctuation in characteristics.

The present invention does not increase the size of optical printers and the like because it does not require the addition of new special circuits or components.

Although the present invention has been fully described by way of examples with reference to the accompanying drawings, it is to be noted that various changes and modifications will be apparent to those skilled in the art. Therefore, unless otherwise such changes and modification depart form the scope of the present invention, they should be construed as being included therein.

What is claimed is:

1. A light modulating apparatus comprising:
    a material having an electro-optic effect, said material including a portion where an electric field is applied, wherein an electrical characteristic of a part of said portion is modified so as to avoid residual electrical charge within said portion; and
    means for applying an electric field to said portion of said material.

2. The light modulation apparatus claimed in claim 1, wherein the electrical resistivity of said part is reduced.

3. The light modulation apparatus claimed in claim 1, wherein the photoconductivity of said part is increased.

4. The light modulation apparatus claimed in claim 1, wherein said electric field applying means includes a pair of electrodes provided on said material.

5. The light modulation apparatus claimed in claim 1, wherein said material includes an area which transmits light, and wherein said electrical characteristic of the material is modified over the whole area which transmits light.

6. A method for making a light modulation apparatus comprising the following steps of:

providing a material having an electro-optic effect;

modifying an electrical characteristic of at least a portion of said material so as to avoid residual electrical charge within said portion; and providing a pair of electrodes on said material for applying an electric field.

7. The method for making a light modulation apparatus claimed in claim 6, wherein said material includes an area which transmits light, and wherein said electric characteristic of the material is modified over the whole area which transmits light.

8. A method for making a light modulating apparatus comprising the following steps of:

providing a material having an electro-optic effect;

heating said material so as to avoid residual electrical charge within the material; and providing a pair of electrodes on said material for applying an electric field.

9. The method for making a light modulation apparatus claimed in claim 8, wherein said material includes an area which transmits light, and wherein said material is heated on the whole area which transmits light.

10. A light modulating apparatus comprising:

a material having an electro-optic effect, said material being shaped to form a block, wherein an electrical characteristic of a part of said block is modified so as to avoid residual electrical charge within said part; and a pair of electrodes provided on opposite side surfaces of said block.

11. The light modulation apparatus claimed in claim 10, wherein said material is a PLZT.

12. The light modulation apparatus claimed in claim 10, wherein the electrical resistivity of said part is reduced.

13. The light modulation apparatus claimed in claim 10, wherein the photoconductivity of said part is increased.

14. The light modulation apparatus claimed in claim 10, wherein said part is adjacent a top surface of said block.

15. The light modulation apparatus claimed in claim 10, wherein said material includes an area which transmits light, and wherein said electric characteristic of the material is modified over the whole area which transmits light.

16. A light modulation apparatus comprising:

a material having an electro-optic effect, wherein an electrical characteristic of at least a part of said material is modified so as to avoid residual electrical charge within said part; and a pair of electrodes provided on a surface for applying an electrical field to said material.

17. The light modulation apparatus claimed in claim 16, wherein said material is a PLZT.

18. The light modulation apparatus claimed in claim 16, wherein an electrical resistivity of said part is lower than the remaining part of said material.

19. The light modulation apparatus claimed in claim 16, wherein the photoconductivity of said part is higher than the remaining part of said material.

20. The light modulation apparatus claimed in claim 16, wherein said pan is adjacent the surface on which said electrodes are provided.

21. The light modulation apparatus claimed in claim 16, wherein said material includes an area which transmits light, and wherein said electric characteristic of the material is modified over the whole area which transmits light.

22. A method for making a light modulating apparatus, comprising the steps of:

providing a material having electro-optic properties;

forming a layer made of a metal on a portion of said electro-optic material; and modifying an electrical characteristic of said portion in the absence of an applied electrical field condition after formation of said layer.

23. The method for making a light modulating apparatus as claimed in claim 22, wherein electrical resistivity of said portion is reduced.

24. The method for making a light modulating apparatus as claimed in claim 22, wherein photoconductivity of said portion is increased.

25. The method for making a light modulating apparatus as claimed in claim 22, wherein the metal is aluminum.

26. The method for making a light modulating apparatus as claimed in claim 22, further comprising the steps of:

removing said layer after the modification; and forming an electrode on said material.

27. The method for making a light modulating apparatus as claimed in claim 22, wherein the transmittance of said portion is reduced.

28. A method for making a light modulating apparatus comprising the following steps of:

providing a material having electro-optic properties;

forming a layer made of aluminum on a portion of said electro-optic material; and heating said electro-optic material after formation of said layer.

29. The method for making a light modulating apparatus as claimed in claim 28, wherein electrical resistivity of said portion is reduced.

30. The method for making a light modulating apparatus as claimed in claim 28, wherein photoconductivity of said portion is increased.

31. The method for making a light modulating apparatus as claimed in claim 28, further comprising the following steps of:

removing said layer after the heating; and forming an electrode on said material.

32. The method for making a light modulating apparatus as claimed in claim 28, wherein the transmittance of said portion is reduced.

33. The method for making a light modulating apparatus as claimed in claim 28, wherein said metal is aluminum.

34. A light modulating apparatus comprising:

a non-organic material having an electro-optic effect; and an electrode which is formed on said material;

wherein an electrical characteristic of at least a portion of said material is modified in the absence of an applied electrical field condition after the formation of said electrode.

35. The light modulating apparatus as claimed in claim 34, wherein electrical resistivity of the portion is reduced.

36. The light modulating apparatus as claimed in claim 34, wherein photoconductivity of the portion is increased.

37. The light modulating apparatus as claimed in claim 34, wherein the electrode is made of aluminum.

38. The light modulating apparatus as claimed in claim 34, wherein the transmittance of said portion is reduced.

39. A light modulating apparatus comprising:

a non-organic material having an electro-optic effect; and an electrode which is formed on said material;

wherein said material is heated after the formation of said electrode.

40. The light modulating apparatus as claimed in claim 39, wherein electrical resistivity of the material is reduced.

41. The light modulating apparatus as claimed in claim 39, wherein photoconductivity of the material is increased.

42. The light modulating apparatus as claimed in claim 39, wherein the electrode is made of aluminum.

43. The light modulating apparatus as claimed in claim 39, wherein the transmittance of said material is reduced relative to material which has not been heated.

44. A method for making a light modulating apparatus, comprising the steps of:

providing an electro-optic material;

forming a layer made of a metal on a portion of said electro-optic material;

modifying an electrical characteristic of said portion after formation of said layer;

removing said layer after the modification; and forming an electrode on said material.

* * * * *

UNITED STATES PATENT AND TRADEMARK OFFICE
CERTIFICATE OF CORRECTION

PATENT NO. : 5,745,280
DATED : April 28, 1999
INVENTOR(S) : KITANO

Figure 1:
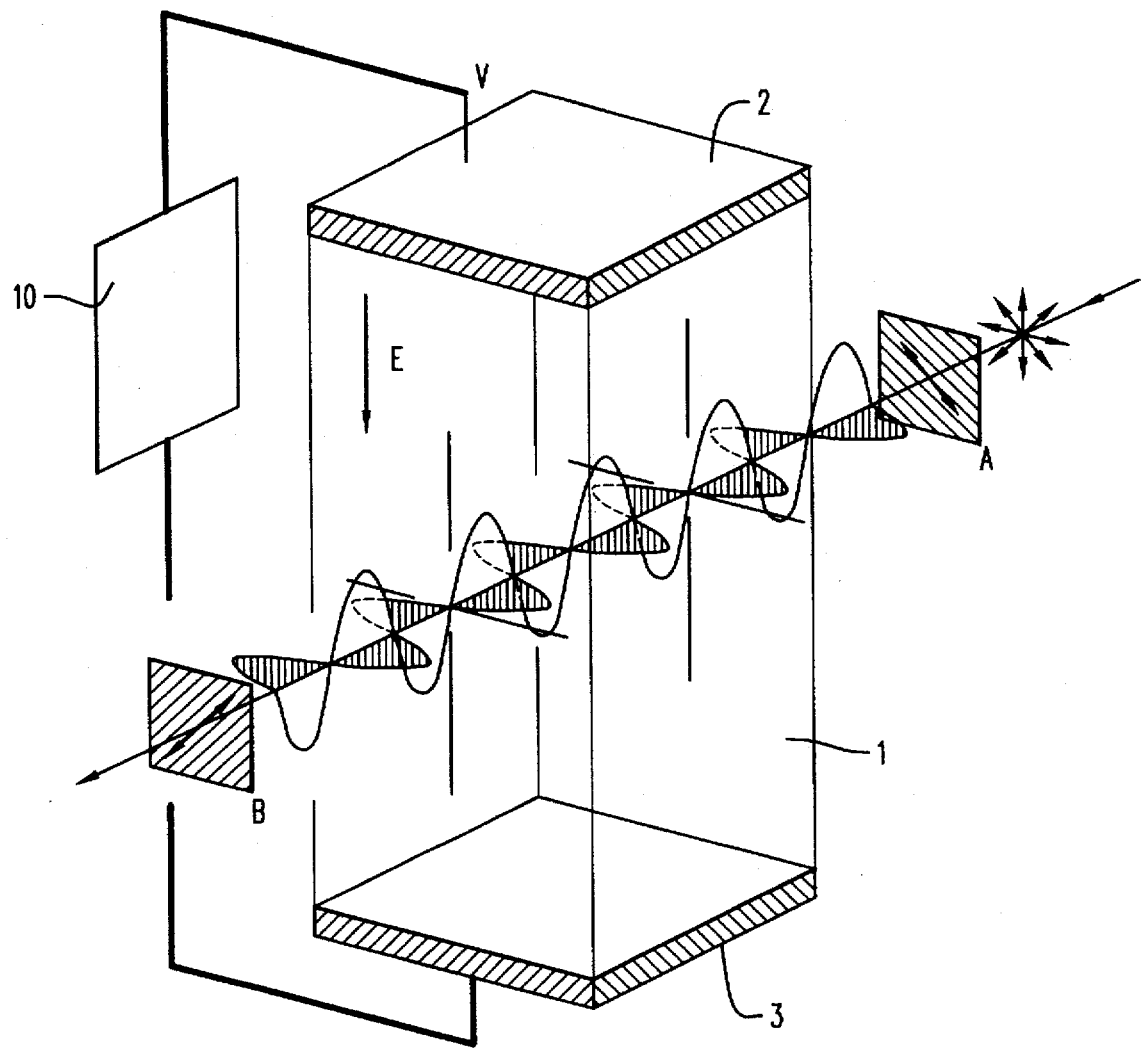
FIG. 1 is a perspective view showing the construction of a conventional light modulation apparatus.

It is certified that error appears in the above-identified patent and that said Letters Patent is hereby corrected as shown below:

The sheet of drawing consisting of figure 1, should be deleted to appear as per attached figure 1.

Signed and Sealed this

Twenty-fifth Day of January, 2000

Attest:

Attesting Officer

*Acting Commissioner of Patents and Trademarks*